(12) United States Patent
Sheynblat

(10) Patent No.: US 7,433,693 B2
(45) Date of Patent: Oct. 7, 2008

(54) LOCATION-SENSITIVE CALIBRATION DATA

(75) Inventor: Leonid Sheynblat, Hillsborough, CA (US)

(73) Assignee: Qualcomm Incorporated, San Diego, CA (US)

( * ) Notice: Subject to any disclaimer, the term of this patent is extended or adjusted under 35 U.S.C. 154(b) by 458 days.

(21) Appl. No.: 11/000,702

(22) Filed: Nov. 30, 2004

(65) Prior Publication Data

US 2006/0089153 A1    Apr. 27, 2006

Related U.S. Application Data

(60) Provisional application No. 60/622,884, filed on Oct. 27, 2004.

(51) Int. Cl.
*H04Q 7/20*    (2006.01)
(52) U.S. Cl. .............. 455/456.1; 455/456.2; 455/456.5; 455/404.2; 342/118; 342/357.02
(58) Field of Classification Search .............. 455/456.1, 455/456.2, 456.5, 404.2; 342/118, 357.02
See application file for complete search history.

(56) References Cited

U.S. PATENT DOCUMENTS

| | | | |
|---|---|---|---|
| 6,195,556 B1 * | 2/2001 | Reudink et al. .......... | 455/456.2 |
| 6,716,101 B1 * | 4/2004 | Meadows et al. ........ | 455/456.1 |
| 7,116,996 B2 * | 10/2006 | Lazaro et al. ............ | 455/466 |
| 7,130,646 B2 * | 10/2006 | Wang ...................... | 455/456.5 |
| 2002/0102989 A1 | 8/2002 | Calvert et al. | |
| 2003/0008668 A1 | 1/2003 | Perez-Breva et al. | |
| 2004/0203904 A1 * | 10/2004 | Gwon et al. ............. | 455/456.1 |
| 2005/0012656 A1 * | 1/2005 | Reisman et al. .......... | 342/118 |
| 2005/0032531 A1 * | 2/2005 | Gong et al. ............. | 455/456.5 |
| 2005/0040968 A1 * | 2/2005 | Damarla et al. ......... | 340/825.49 |
| 2005/0246334 A1 * | 11/2005 | Tao et al. ................ | 707/5 |

FOREIGN PATENT DOCUMENTS

WO    03101140 A1    12/2003

OTHER PUBLICATIONS

Wang S.S.P. et al: E-911 Location Standards and Location Standars Services: Emerging Technology Symposium: Braodband, Wireless Internet Access, 2000 IEEE Apr. 10-11, 2000, Piscaway, NJ, USA, IEEE, Apr. 10, 2000, pp. 1-5.

Kunczier H. et al: "Enhanced Cell ID Based Terminal Location for Urban Area Location Based Applications" Consumer Communications and Networking Conference, 2004. CCNC 2004. First IEEE Las Vegas, NV, USA, IEEE, Jan. 5, 2004 Piscataway, NJ, USA, IEEE, Jan. 5, 2004, pp. 595-599.

* cited by examiner

*Primary Examiner*—Sanh D Phu
(74) *Attorney, Agent, or Firm*—Richard A. Bachard; Linda G. Gunderson; Thomas R. Rouse

(57) ABSTRACT

A system, method and device are provided for determining the position of a mobile station through the identification of an approximate position of the mobile station. Thereafter received signal strength (RSSI) fingerprint data for the approximate position is requested and retrieved. The fingerprint data and received signal strength data collected at the mobile station are compared in connection with fixing the position of the mobile station.

24 Claims, 4 Drawing Sheets

LOCATION-SENSITIVE CALIBRATION DATA

CROSS-REFERENCE TO RELATED APPLICATION

This application claims priority from copending provisional patent application 60/622,884, filed Oct. 27, 2004.

BACKGROUND

Locating people, vehicles employees, etc. has become a matter of increased importance over the last several years, especially through the medium of a mobile phone. Much interest in determining mobile phone position was prompted by the Federal Communications Commission (FCC) through its edict to create the wireless Enhanced 911 system (E911) by November 2005.

Several technologies are available and have been proposed for mobile station (e.g. mobile phone, personal digital assistant (PDA) with telecommunications capability, portable computer with telecommunications capability, pager etc.) position determination ranging from use of the global positioning systems (GPS) to phone network-based solutions. Fingerprinting provides another approach to determining the position of a mobile station.

Radio frequency signal characteristics associated with various regions in a signal transmission area are collected in a database. Each grouping of signal characteristics for a region is known as a fingerprint. Typically, the position of a mobile station is determined by comparing a RF data sample collected by the mobile station to fingerprint data in the database. The mobile station's position is determined to lie in the area corresponding to a fingerprint data point of highest correlation to the RF data sample.

The comparison is made by a server holding the fingerprint data. If the comparison were to be accomplished at a mobile station, in accordance with conventional practices, a significant amount of data would have to be downloaded from a network-based database to the mobile station. Fingerprinting requires multiple measurements to be taken from different base stations or cell sites, e.g., base station transceivers (BTSs), at different times of day to capture short-term signal variation (Rayleigh fading, etc.) and variations in network load (capacity) in an effort to capture each fingerprint calibration point for a fingerprint database. Consequently, downloading the fingerprint database to the mobile station would likely be infeasible.

Received signal strength indicator (RSSI) has been used in connection with network planning and fingerprinting by Ekahau, Inc. Radio network sample points are collected from different site locations. Each sample point contains RSSI data together with related map coordinates which are stored in a database for position tracking of persons, assets, equipment, etc. within a Wi-Fi network (802.11a/b/g).

However, this Wi-Fi based Ekahau system is for small applications wherein a program run on a server calculates position determinations and interacts with a client device (i.e., laptop computer, personal digital assistant (PDA), Wi-Fi Tag, etc.) in connection with an application program for recording field data (e.g., RSSI data). The position determination data returned can include the speed, heading, building floor and grid location of client device. For larger scale applications, several U.S. wireless carriers determine a mobile phone's location using RSSI measurements made from and by nearby BTSs.

Triangulation techniques can result in duplicative calculations at a network server which can unnecessarily burden the system, especially in heavily trafficked networks. While not subject to many of the problems associated with other position identifying technologies, fingerprinting requires substantial work in data collection and is most feasible in highly populated, highly concentrated metropolitan areas. However, fingerprinting benefits from the collection of multi-path signal data which arises through indirect signal paths from transmitter to receiver. A need exists to seize on the benefits of fingerprinting in a manner that improves current RSSI position measurement techniques.

DETAILED DESCRIPTION

An improved position determination method, system, and device are provided for a mobile station, especially for use in highly populated areas exhibiting multi-path signal patterns. Familiar locations having such multi-path signal patterns include, for example, the Chicago, Manhattan, or San-Francisco financial districts.

In one position determination aspect, fingerprint data is stored in a network database, and relevant portions of the database are downloaded to the mobile station in connection with identifying an approximate signal reception area in which the mobile station lies. The fingerprint database includes RSSI data.

Figure 1:
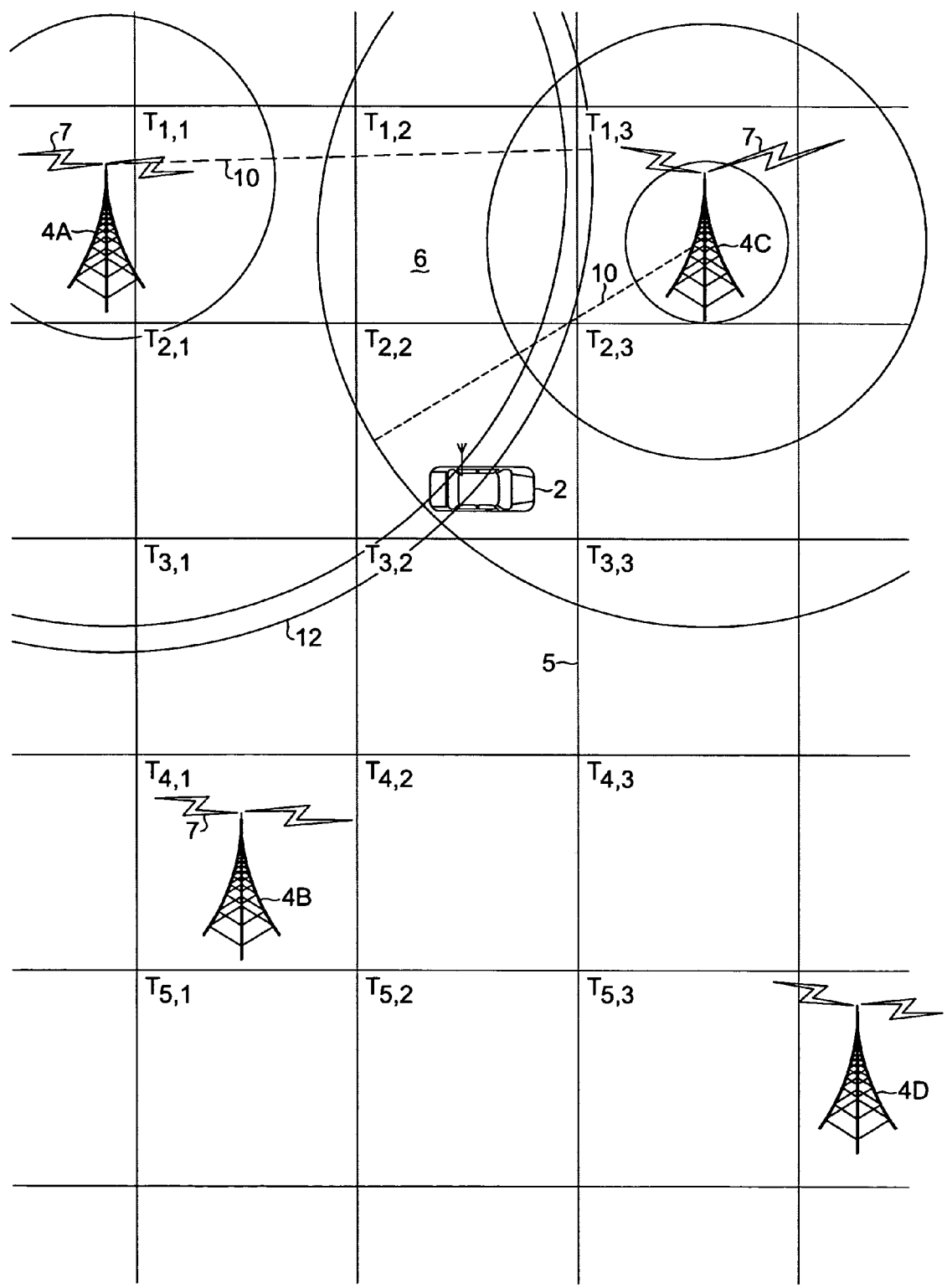
FIG. 1 is a diagram of a mobile station and several BTSs organized in a grid, with each grid division being assigned a token look-up, indicated by a subscripted "T".

With reference to FIG. 1, which illustrates a diagram including mobile station 2 (suggesting a car phone) and several transmitting receiving sites, such as BTSs organized in grid 5, each grid division is assigned a token look-up indicated by a subscripted "T". The subscripts refer to the row and column of grid 5.

The embodiments can be used in conjunction with several different radio access channel systems, including, for example, code division multiple access (CDMA), time division multiple access (TDMA), frequency division multiple access (FDMA), space division multiple access (SDMA), or like systems.

In the case of CDMA systems, signals are spread over a frequency and coded. Such characteristics contribute to signal properties allowing privacy and jamming resistance. Coding is accomplished using code resembling noise, which is referred to as pseudorandom scrambling code or pseudo noise. Whereas other mobile systems regard multipath signal characteristics as being undesirable, with CDMA, a multipath signal has some desirable aspects in that the multi-path signals can be used to increase the quality of a signal. This is made possible because the wideband nature of CDMA signals. Each BTS site 4 transmits a pseudo noise (PN) code having a unique code sequence, (including a base station identification (BASE-ID) which mobile station 2 can distinguish in the BTS's pilot signal on the forward link (communication from a BTS to mobile station) pilot channel. The pilot channel constantly transmits signal 7 which mobile station 2 uses to acquire the communication system. After mobile station 2 has acquired the system, pilot signal 7 is used for signal strength measurement.

The strength of the pilot signal from a BTS to a mobile station is used to determine the power required to properly adjust the strength of a mobile station's signal transmission. Additionally, according to one aspect, the pilot signal strength can be used to identify transmitting BTSs in an effort to define relevant look-up tokens from a network database (not shown) which contains pertinent RSSI database information for comparison with the RSSI data measured at mobile station 2.

The relevant look-up token information can be determined from a single BTS. For instance, BTS 4A can be circumscribed within circle 12 (shown partially) defining a transmitting radius 10. Look-up token data within circle 12 of a given radius 10 can be downloaded to mobile station 2. Radius 10 can be of a predetermined length, a parameter selection characteristic that is especially suitable for multi-path signal environments. Alternatively, the length of radius 10 can be tailored as a function of pilot signal strength. For instance, the stronger the signal, the smaller the radius length needed since a closer proximity to a BTS may be inferred and a fewer number of look-up tokens analyzed.

Mobile station 2 compares the downloaded look-up token information based on a single BTS 4 with RSSI data measured at its position to assess its location. Since each look-up token T corresponds to a mapped location, choosing the look-up token with closest correlation to the measured RSSI data allows a position fix at location corresponding to that look-up token. As can be judged from FIG. 1's grid 5 of look-up tokens, more look-up tokens over a given area will allow tighter grid spacing and thus provide a better basis for a more accurate position determination.

In an alternative embodiment, the pilot signals from two BTSs are used to determine the relevant look-up token data for analysis. As shown in FIG. 1, intersecting radii 10 from BTSs 4A and 4C, respectively, define a region of intersection 6 on grid 5. Consequently, the affected areas in region 6 relate to look-up tokens which include $T_{1,1}$, $T_{1,2}$, $T_{2,1}$, $T_{1,3}$, and $T_{2,2}$. The look-up tokens within the region of intersection 6 are downloaded to mobile station 2. By using two BTSs to define the relevant look-up tokens, fewer look-up tokens may have to be analyzed as compared with look-up tokens within a transmission radius of a single BTS 4. As with the previous embodiment, radius 10 can be of a predetermined length or it can be tailored to represent a function of pilot signal strength from each BTS. Accordingly, each radius 10 associated with a given BTS 4 need not be the same length.

In another alternative embodiment, other methods of determining the relevant look-up token data for analysis, and therefore an approximate location for the mobile station, may be used. For instance the pilot signal from yet a third BTS, BTS 4B, can be used to establish another intersecting circle (not shown) in a manner employing advanced forward link trilateration (AFLT). With AFLT, the mobile station takes RSSI measurements of signals from nearby cellular base stations (towers) in addition to the relative times of arrival (TOA) measurements, and uses these readings to trilaterate an approximate location of the handset.

Additionally, pertinent RSSI fingerprint data for download to the mobile station can also be based on a cell-ID (cellular identifiers) information, or enhanced cell-ID through the identification of cellular base station masts proximate the mobile station. Enhanced Cell-ID is a network technology that combines cell-ID with one or more additional technologies. The level of accuracy is increased over basic cell-ID. For example, in GSM networks, the additional technologies for combination can include Timing Advance (which measures handset range from the base station, including whether or not the handset is connected to the nearest cell) and RSSI.

Table 1 below summarizes the expected performance in terms of average accuracies of position determination according to the method indicated to obtain a location approximation. The accuracies define the search regions for RSSI matching and reduce significantly the number of grids to be provided to and examined by the mobile station.

TABLE 1

| Location Approximation Method | AFLT | Enhanced Cell-ID | Cell-ID |
|---|---|---|---|
| Average Accuracy of Position Determination | 100 to 200 m | 150 to 1000 m | 750 m to 3-5 km |

Figure 2:
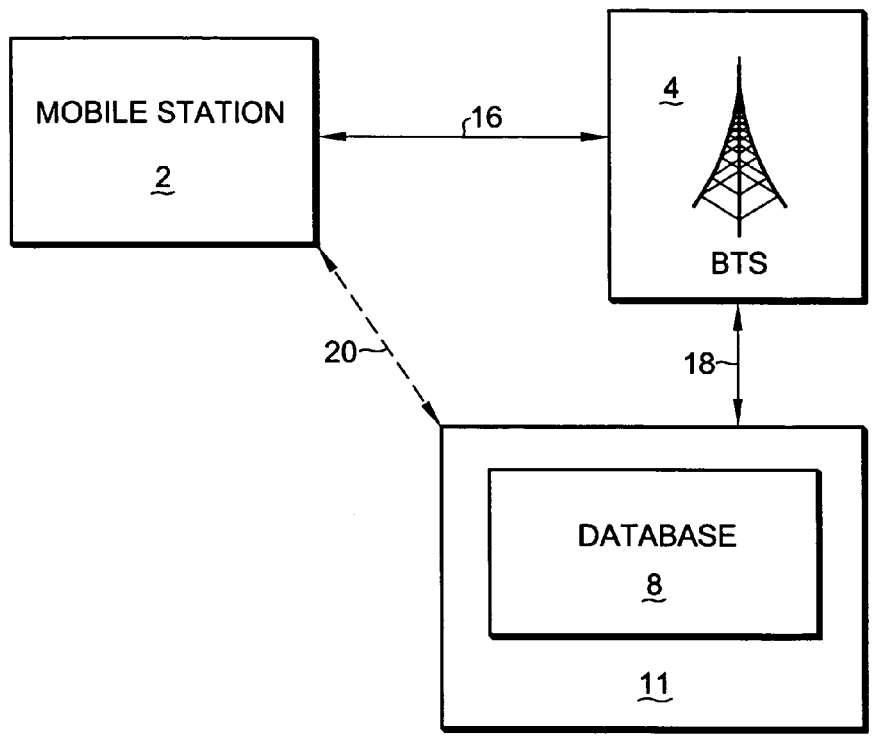
FIG. 2 is a block diagram of an embodiment of a communication system.

FIG. 2 is a block diagram showing a system in which the interaction of mobile station 2 with BTS 4 and database 8 can be located remotely from mobile station 2 and BTS 4. Interaction is such that a request, denoted by the outgoing end of double arrow 16, to a BTS 4 (having the strongest pilot signal strength indication), for selected look-up tokens can be made by mobile station 2 in connection with analyzing signal strength data received from BTSs. Look-up token information can be received by the same BTS 4 from database 8 in connection with a request to a server 11 at which the database is resident. Alternatively, database 8 information can be forwarded to mobile station 2 through another BTS (not shown) as indicated by dotted lined arrow 20.

In an alternative embodiment, other unique cellular identifiers in addition to the base station identification (BASE-ID) can be used to identify an area of interest in connection with downloading the pertinent fingerprint data. These identifiers include the system identification (SID)/network identification (NID)/BASE-ID and SID/mobile switching center identification (MSC-ID)/BASE-ID.

Figure 3:
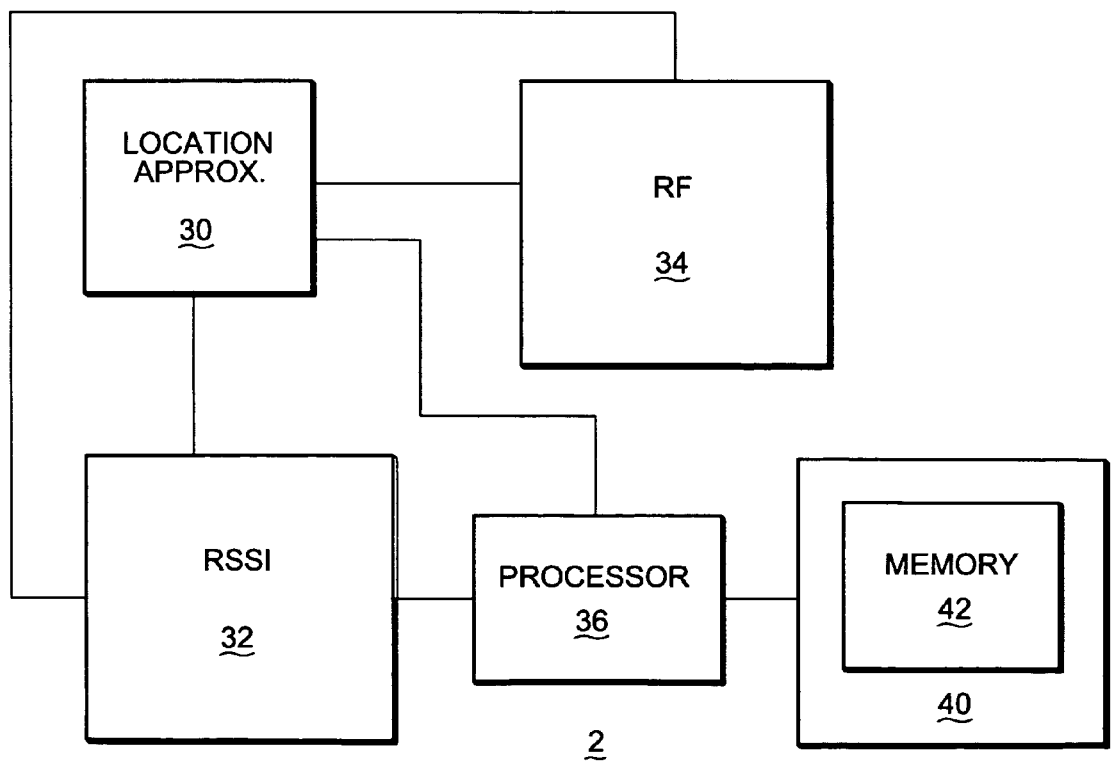
FIG. 3 is a block diagram of mobile station.

FIG. 3 is a block diagram of mobile station 2. As shown, mobile station 2 includes a location approximation identifier section 30 which identifies the pertinent portion of the fingerprint database to download to mobile station 2 in accordance with one of the location approximation methods discussed herein, i.e. AFLT, enhanced Cell-ID, etc. RSSI section 32 determines RSSI measurements at mobile station 2 working in conjunction with a radio frequency communication section 34 for providing mobile communications and processor 36 for processing data within mobile station 2. The RSSI measurements, request for pertinent fingerprint data and determination of mobile station position occur in connection with software 42 held in memory 40.

Figures 4, 5:
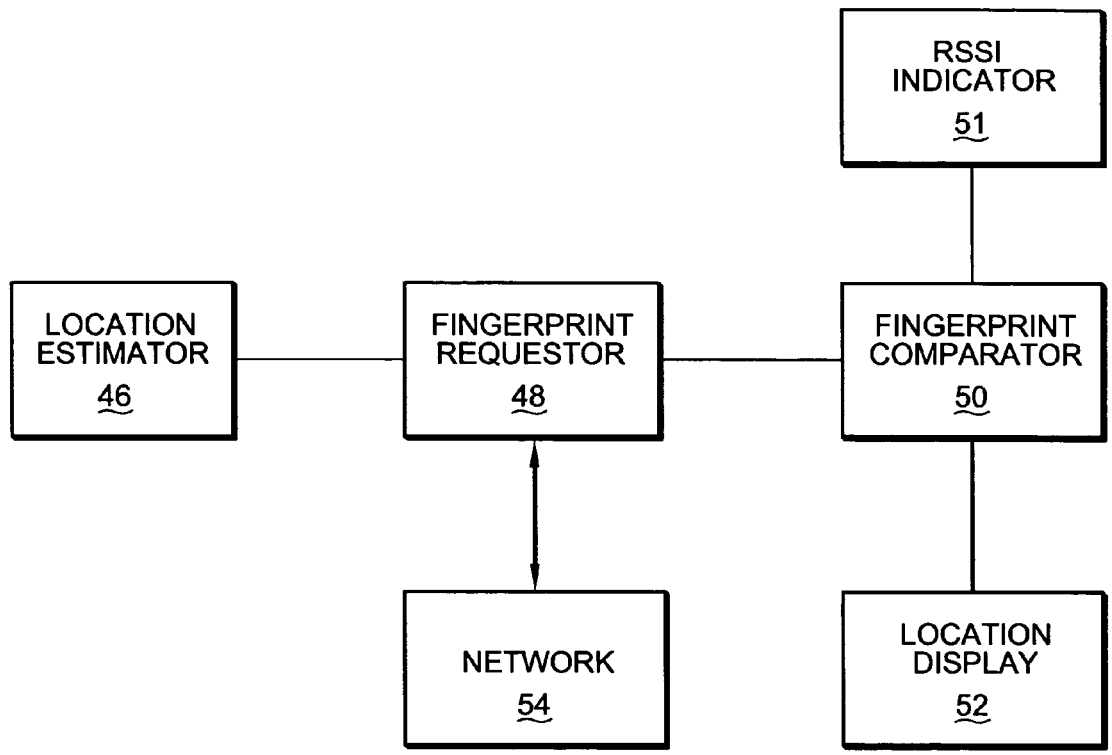
FIG. 4 illustrates a functional block diagram of a mobile station position location system.
FIG. 5 is a chart illustrating the type of data which can be maintained in fingerprint database.

FIG. 4 is a functional block diagram of a mobile station position location system. As shown, location estimator 46 identifies an approximate location of the mobile station according to one of methods discussed herein. Alternatively, location estimator can be implemented in the network 54. Fingerprint requestor 48 requests and obtains the pertinent fingerprint data for the approximate location identified by location estimator 46. Fingerprint comparator 50 compares the measured RSSI data as determined by RSSI indicator 51 with the fingerprint data received from network 54 through fingerprint requestor 48 in connection with requestor 48's fingerprint request.

A mobile station's position is determined by fingerprint comparator 50 in connection with choosing a look-up token with highest correlation to the RSSI data measured by RSSI indicator 51. The area corresponding to the look-up token is chosen as the position of the mobile station. The mobile station's location is displayed on location display 52. The location can be displayed in terms of latitude and longitude readings. Additionally, or alternatively, the location can include a representative street address. Alternatively, location display step may entail mapping and displaying location on the digital map. In yet another embodiment the location can be provided to an application internal or external to the mobile station for further processing and display.

FIG. 5 is a chart illustrating the type of data which can be maintained in fingerprint database 8 that is used to determine the position of the mobile station. As shown, database 8 can hold tower entries indicating the identity of towers for defining the areas of look-up token interest. FIG. 5 show an example of two tower entries. However, more tower entries can be used to define a look-up token area. For further refinement of the look-up token area, the intersecting areas between two towers can be documented as determined by a specified radius, defining BTS antenna coverage or antenna range, out from each BTS. Note, however, that it is useful to maintain single tower entries in database 8 to account for circumstances where a single tower is sufficient to define the look-up token area and where only a single tower reception is relevant. RSSI tokens as defined by the tower intersection area or single tower, can be maintained in database 8. Location as defined by latitude and longitude readings, among other measures, can also be maintained in database 8.

Figure 6:
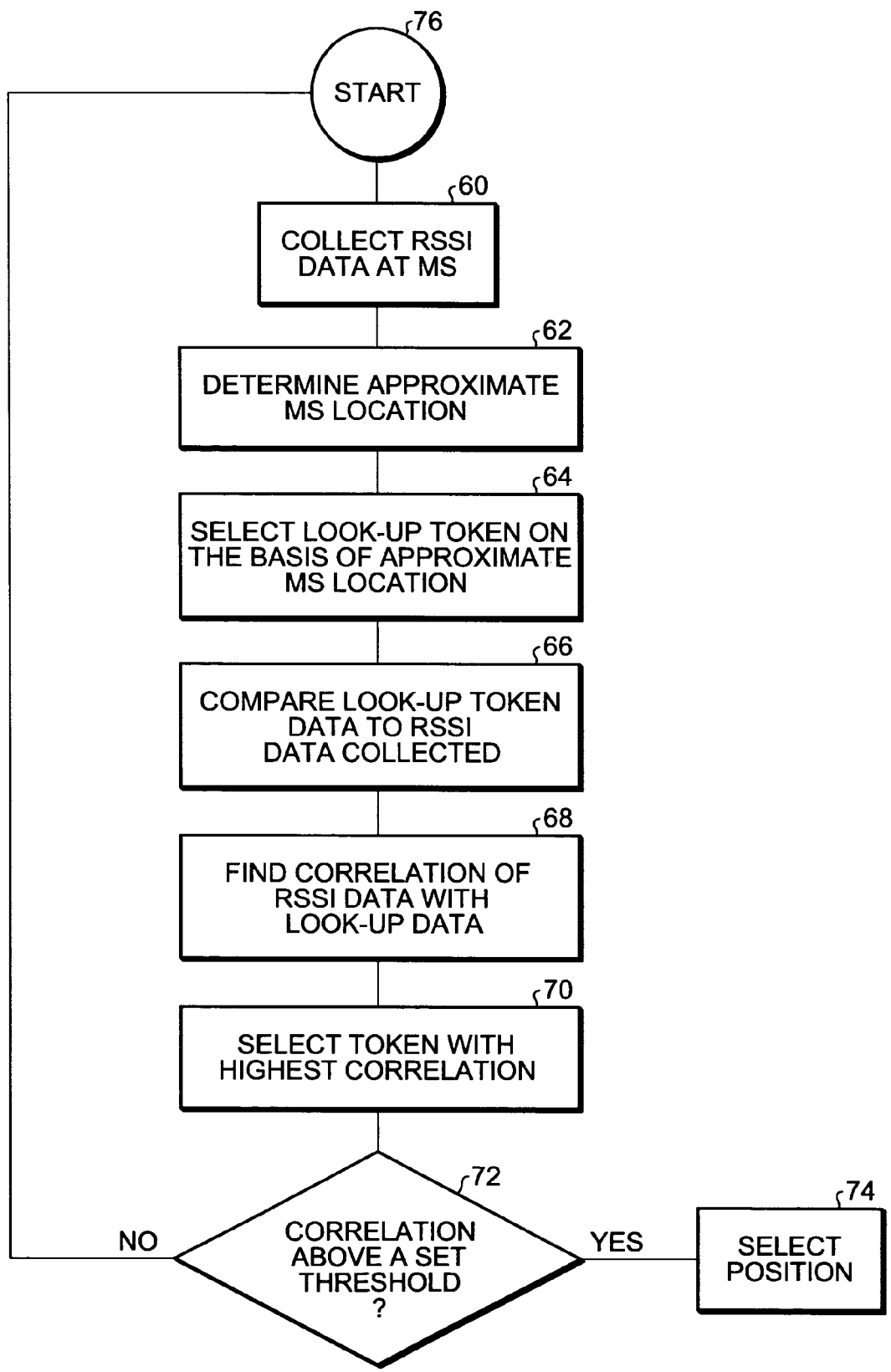
FIG. 6 is a flowchart of a method for determining a position of a mobile station.

FIG. 6 is a flowchart showing a method for position determination of a mobile station. As shown, RSSI data is collected by the mobile station, 60. Thereafter, an approximate location of the mobile station is determined, 62. The approximate location of the mobile station can be determined according to one of the foregoing discussed techniques. For instance, in one aspect, the mobile station determines the nearest BTS site based on pilot signal strength from the transmitted pilot signal on the received pilot channel. A second and next nearest BTS tower is identified based on the $2^{nd}$ and next strongest pilot signal. Based on the intersection of overlapping reception areas from the two or more identified BTS sites, an area of interest of relevant look-up tokens is defined and supplied to the mobile station.

In another aspect, look-up token data is defined corresponding to an area identified as being proximate to the mobile station, 64. These look-up tokens are compared, preferably at a server holding the look-up token database, with the RSSI data collected by the mobile station, 66. A correlation is calculated between each look-up token data point in the defined area of interest, 68. The look-up token with the highest correlation to the collected RSSI data is selected, 70, and compared with a predetermined correlation threshold, 72. For instance, should an 80% correlation between the look-up token and collected RSSI data be sufficient then the selected look-up token is chosen indicative of a corresponding position location (street address, longitudinal and latitudinal indication, etc.) of the mobile station, 74. If the selected look-up token of highest correlation fails to meet the threshold value, the method is restarted, starting with collection of RSSI data by the mobile station, 60, in an effort to obtain a position fix for the mobile station. The use of many known algorithms related to nearest neighbor search and signal pattern matching is also contemplated herein. These techniques can be employed to further refine the location estimate.

Although a description has been given with reference to particular embodiments, it is to be understood that these embodiments are merely illustrative of the principles and applications. It is therefore to be understood that numerous modifications may be made to the illustrative embodiments and that other arrangements may be devised without departing from the spirit and scope as defined by the appended claims.

The invention claimed is:

1. A system for determining the position of a mobile station comprising:
   a location estimator for identifying an approximate position of the mobile station;
   a fingerprint requestor for requesting and obtaining, through radio channel access, pertinent location fingerprint data from a fingerprint database remote from said mobile station, said pertinent location fingerprint data being indicative of the approximate position of the mobile station; and
   a fingerprint comparator for comparing measured RSSI data at said mobile station with said pertinent location fingerprint data in order to determine a position of the mobile station.

2. A system for determining the position of a mobile station as recited in claim 1 further comprising a display, said display being operable to indicate the position of the mobile station.

3. A system for determining the position of a mobile station as recited in claim 1 wherein said radio channel access is provided through a technique selected from the group of radio-channel access schemes consisting of CDMA, TDMA, FDMA, SDMA, and a combination thereof.

4. A system for determining the position of a mobile station as recited in claim 1 wherein said remote fingerprint database contains RSSI data.

5. A system as recited in claim 1 wherein said mobile station is a mobile communications device selected from the group consisting of a mobile phone, a personal digital assistant with wireless communications capability, a portable computer with wireless communications capability and a pager.

6. A mobile station comprising:
   a location approximation identification section being operable to identify and download to said mobile station a pertinent portion of a remote fingerprint database, the pertinent portion of a remote fingerprint database corresponding to a vicinity of said mobile station;
   a RSSI section for making RSSI measurements at said mobile station;
   a memory;
   a processor;
   software held in memory and run in said processor for determining a position of said mobile station by comparing said pertinent portion of said remote fingerprint database corresponding to the vicinity of said mobile station with said RSSI measurements made at said mobile station.

7. A mobile station as recited in claim 6 wherein said location approximation identification section identifies a pertinent portion of a remote fingerprint database, corresponding to a vicinity of said mobile station by a method of advanced forward link trilateration.

8. A mobile station as recited in claim 6 wherein said location approximation identification section identifies a pertinent portion of a remote fingerprint database through identification of a base station site in the vicinity of said mobile station by measuring base station pilot signal strength.

9. A mobile station as recited in claim 6 wherein said location approximation identification section identifies a pertinent portion of a remote fingerprint database, corresponding to a vicinity of said mobile station by a method using cell-ID through the identification of a cellular base station located proximate said mobile station.

10. A mobile station as recited in claim 6 wherein said location approximation identification section identifies a pertinent portion of a remote fingerprint database, corresponding to a vicinity of said mobile station by a method using enhanced cell-ID.

11. A system for determining the position of a mobile station comprising:
   a fingerprint database including RSSI data;
   a mobile station including a location estimator for identifying an approximate position of said mobile station;
   a fingerprint requestor for requesting and obtaining, through radio channel access, pertinent location fingerprint data from a fingerprint database remote from said mobile station, said pertinent location fingerprint data being indicative of the approximate position of the mobile station; and
   a fingerprint comparator for comparing measured RSSI data at said mobile station with said pertinent location fingerprint data in order to determine a position of said mobile station.

12. A method of determining the position of a mobile station comprising:
   collecting RSSI data at a mobile station;
   determining an approximate location of said mobile station;
   selecting fingerprint look-up token data, from a database located remote from said mobile station, corresponding to said approximate location of said mobile station;
   comparing said fingerprint look-up token data selected from the database corresponding to said approximate location of said mobile station with said RSSI data collected at said mobile station; and
   determining a position of said mobile station in accordance with finding said fingerprint look-up token data of highest correlation with said RSSI data.

13. A method of determining the position of a mobile station as recited in claim 12 further including determining whether said highest correlation meets a predetermined threshold.

14. A method of determining the position of a mobile station as recited in claim 13 wherein said method is reiterated should said highest correlation fail to meet said predetermined threshold.

15. A method of determining the position of a mobile station as recited in claim 12 wherein said fingerprint look-up token data includes RSSI data.

16. A method of determining the position of a mobile station as recited in claim 12 wherein determining the approximate location of said mobile station is accomplished using a method of AFLT.

17. A method of determining the position of a mobile station as recited in claim 12 wherein determining the approximate location of said mobile station is accomplished through identification of a base station site in the vicinity of said mobile station measuring base station pilot signal strength.

18. A method of determining the position of a mobile station as recited in claim 12 wherein determining the approximate location of said mobile station is accomplished through identification of a cellular base station antenna located proximate said mobile station.

19. A method of determining the position of a mobile station as recited in claim 12 which further includes displaying said mobile station location.

20. A method of determining the position of a mobile station as recited in claim 19 wherein the display of said mobile station location includes longitudinal and latitudinal readings.

21. A method of determining the position of a mobile station as recited in claim 19 wherein the display of said mobile station location includes street location information.

22. A system for determining the position of a mobile station comprising:
   means for estimating an approximate position of the mobile station;
   means for requesting and obtaining pertinent location fingerprint data from a fingerprint database, said pertinent location fingerprint data being indicative of the approximate position of the mobile station from the means for estimating; and
   means for comparing measured RSSI data at said mobile station with said pertinent location fingerprint data to determine the position of said mobile station.

23. The system for determining of claim 22 wherein the fingerprint database contains RSSI data.

24. The system for determining of claim 22 wherein the means for requesting and obtaining comprises radio channel access.

\* \* \* \* \*